(12) United States Patent
Axe et al.

(10) Patent No.: US 7,882,072 B1
(45) Date of Patent: Feb. 1, 2011

(54) AUTOSAVE FUNCTIONALITY FOR WEB BROWSER

(75) Inventors: Brian Axe, San Francisco, CA (US); Evan Williams, San Francisco, CA (US)

(73) Assignee: Google Inc., Mountain View, CA (US)

( * ) Notice: Subject to any disclaimer, the term of this patent is extended or adjusted under 35 U.S.C. 154(b) by 539 days.

(21) Appl. No.: 11/321,079

(22) Filed: Dec. 30, 2005

(51) Int. Cl.
*G06F 7/00* (2006.01)
*G06F 17/00* (2006.01)

(52) U.S. Cl. .................. 707/654; 707/640; 707/653

(58) Field of Classification Search .......... 707/204; 711/161, 162
See application file for complete search history.

(56) References Cited

U.S. PATENT DOCUMENTS

| | | | | |
|---|---|---|---|---|
| 5,704,029 A | * | 12/1997 | Wright, Jr. ................ 715/223 |
| 5,796,834 A | * | 8/1998 | Whitney et al. ............... 705/60 |
| 5,860,071 A | * | 1/1999 | Ball et al. .................... 707/100 |
| 6,950,980 B1 | * | 9/2005 | Malcolm ..................... 715/207 |
| 7,010,546 B1 | * | 3/2006 | Kolawa et al. .......... 707/103 R |
| 7,062,706 B2 | * | 6/2006 | Maxwell et al. ............. 715/224 |
| 2003/0163782 A1 | * | 8/2003 | Owen ......................... 715/505 |

OTHER PUBLICATIONS

Screenshot of the Outlook New Email window, Microsoft® Office Outlook® 2003.*
Screenshot of the Outlook Email Options dialog box, Microsoft® Office Outlook® 2003.*
"Session Saver .2—Firefox Add-ons—Mozilla Corporation", https://addons.mozilla.org/firefox/436/, Dec. 27, 2006, pp. 1-4.

* cited by examiner

*Primary Examiner*—Tim T. Vo
*Assistant Examiner*—Garrett Smith
(74) *Attorney, Agent, or Firm*—Harrity & Harrity, LLP

(57) ABSTRACT

A system may present a document including a form. Forms content may be received into the form. The received forms content may be periodically and automatically saved to reduce the likelihood that received forms content is lost prior to form submission.

18 Claims, 8 Drawing Sheets

AUTOSAVE FUNCTIONALITY FOR WEB BROWSER

BACKGROUND

1. Field of the Invention

Implementations relate generally to web based information submission and, more particularly, to periodic saving of user submitted information.

2. Description of Related Art

Web based document submission and interactive applications are increasing used in modern business and personal endeavors. In such applications, users typically use local tools such as web browser applications to interact with remote resources, such as web servers, email servers, etc. In typical web-based information entry systems, users prepare information for submission prior to actual transmission of information between a user's client device and a receiving server device. Unfortunately, many existing Internet-based information entry systems fail to adequately safeguard against data loss caused by a myriad of factors, such as power loss, system failure, application failure, user error, etc. This problem is compounded because the number and types of web-based interactive applications and the number of new users inexperienced at using such applications are growing rapidly.

SUMMARY

According to one aspect, a method is provided. The method may include presenting a document including a text entry field; receiving forms content into the text entry field; and periodically and automatically storing the received forms content.

According to another aspect, a system includes means for presenting a document including a text entry field; means for providing a first option for enabling periodic saving of forms content received within the text entry field; means for receiving selection of the first option; means for receiving forms content in the text entry field; and means for periodically storing the received forms content.

According to a further aspect, a method is provided. The method, performed by a device, may include providing a forms autosave feature selectable object within a web browser application window; providing a document having a form within the web browser application window; receiving selection of the forms autosave feature selectable object; and determining whether forms content relating to the document has been previously stored; and refilling the form when it is determined that forms content relating to the document has been previously stored.

According to yet another aspect a computer-readable medium that stores instructions executable by a client device is provided. The computer-readable medium may include instructions for causing the client device to present a document including a form; instructions for causing the client device to receive forms content in the form; and instructions for causing the client device to periodically and automatically save the forms content.

BRIEF DESCRIPTION OF THE DRAWINGS

The accompanying drawings, which are incorporated in and constitute a part of this specification, illustrate an embodiment of the invention and, together with the description, explain the invention. In the drawings.

DETAILED DESCRIPTION

The following detailed description of the invention refers to the accompanying drawings. The same reference numbers in different drawings may identify the same or similar elements. Also, the following detailed description does not limit the invention.

Overview

Systems and methods consistent with the principles of the invention may provide an autosave feature by which textual information entered into a web document may be periodically and persistently saved for future retrieval. The saved textual information may then be reused to recover from unexpected or undesired loss.

Figure 1:
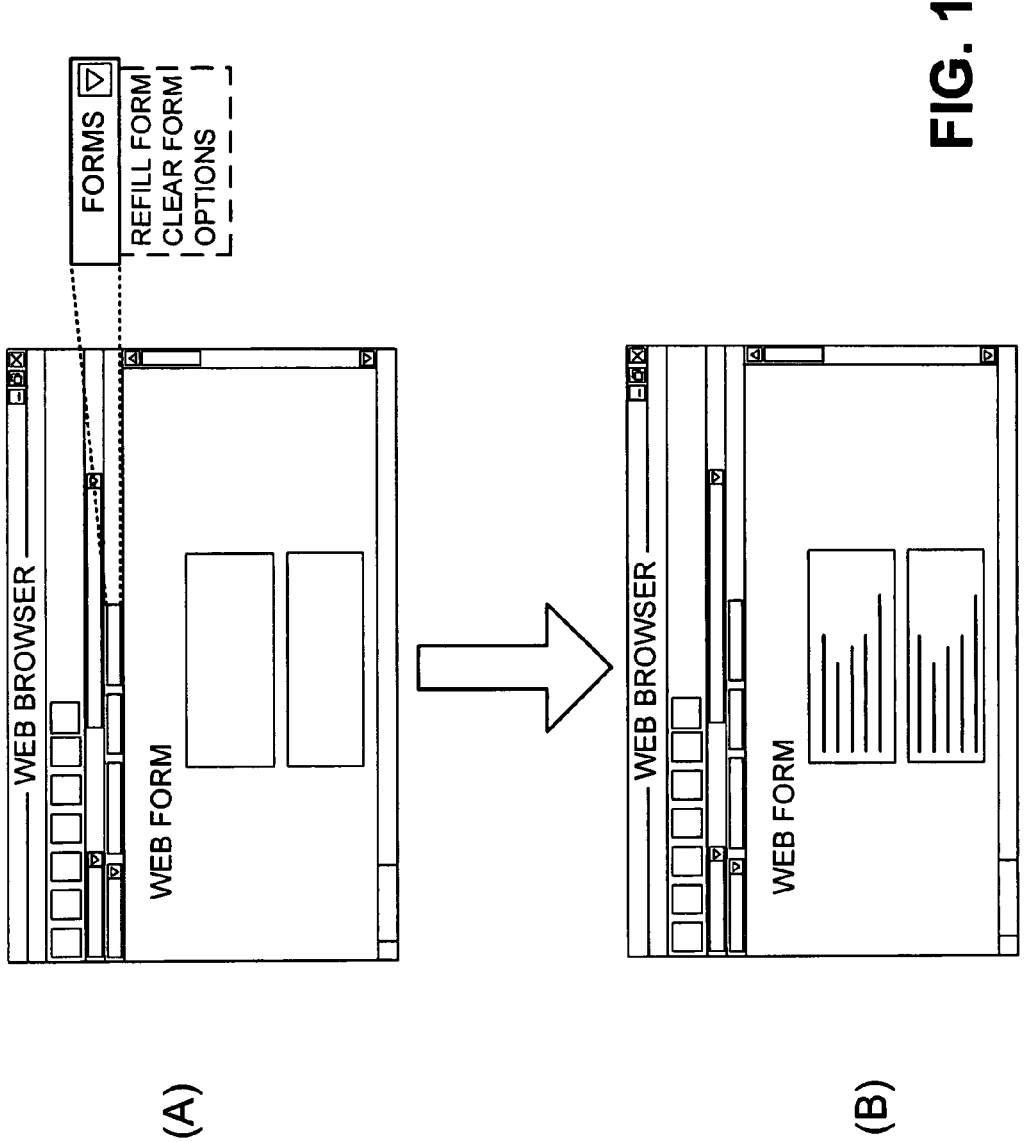
FIG. 1 is an exemplary diagram illustrating a concept consistent with the principles of the invention.

FIG. 1 is an exemplary diagram illustrating a concept consistent with the principles of the invention. As shown at (A), a user may access a web document having a web form, using a web browser. As also shown at (A), the web browser includes functionality associated with a forms autosave feature. The forms autosave feature may permit the user to periodically save and refill forms content within a web form. As shown at (B), selection or activation of the forms autosave feature may effectively cause previous entered forms content to be repopulated within the web form.

A "document," as the term is used herein, is to be broadly interpreted to include any machine-readable and machine-storable work product. A document may include, for example, an e-mail, a web site, a file, a combination of files, one or more files with embedded links to other files, a news group posting, a blog, a business listing, an electronic version of printed text, a web advertisement, etc. In the context of the Internet, a common document is a web page. Documents often include textual information and may include embedded information (such as meta information, images, hyperlinks, etc.) and/or embedded instructions (such as Javascript, etc.). A "link," as the term is used herein, is to be broadly interpreted to include any reference to/from a document from/to another document or another part of the same document.

Exemplary Network Configuration

Figure 2:
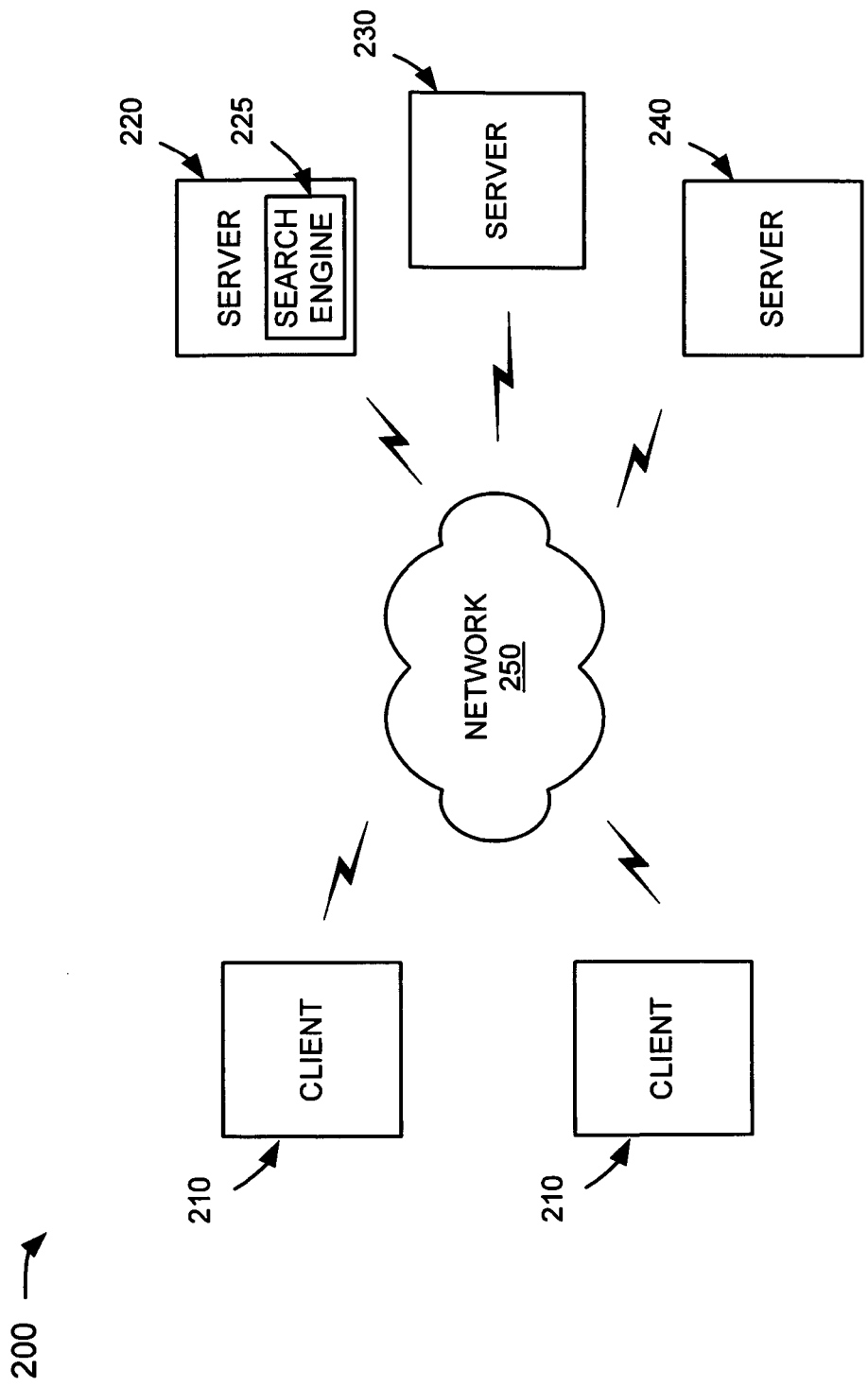
FIG. 2 is an exemplary diagram of a network in which systems and methods consistent with the principles of the invention may be implemented.

FIG. 2 is an exemplary diagram of a network 200 in which systems and methods consistent with the principles of the invention may be implemented. Network 200 may include multiple clients 210 connected to multiple servers 220-240 via a network 250. Two clients 210 and three servers 220-240 have been illustrated as connected to network 250 for simplicity. In practice, there may be more or fewer clients and servers. Also, in some instances, a client may perform a function of a server and a server may perform a function of a client.

Clients 210 may include client entities. An entity may be defined as a device, such as a personal computer, a wireless telephone, a personal digital assistant (PDA), a lap top, or another type of computation or communication device, a thread or process running on one of these devices, and/or an object executable by one of these devices. Servers 220-240 may include server entities that gather, process, search, and/or maintain documents in a manner consistent with the principles of the invention.

In an implementation consistent with the principles of the invention, server 220 may include a search engine 225 usable by clients 210. Server 220 may crawl a corpus of documents, index the documents, and store information associated with the documents in a repository of documents. Servers 230 and 240 may store or maintain documents that may be crawled or analyzed by server 220.

While servers 220-240 are shown as separate entities, it may be possible for one or more of servers 220-240 to perform one or more of the functions of another one or more of servers 220-240. For example, it may be possible that two or more of servers 220-240 are implemented as a single server. It may also be possible for a single one of servers 220-240 to be implemented as two or more separate (and possibly distributed) devices.

Network 250 may include a local area network (LAN), a wide area network (WAN), a telephone network, such as the Public Switched Telephone Network (PSTN), an intranet, the Internet, or a combination of networks. Clients 210 and servers 220-240 may connect to network 250 via wired, wireless, and/or optical connections.

Exemplary Client/Server Architecture

Figure 3:
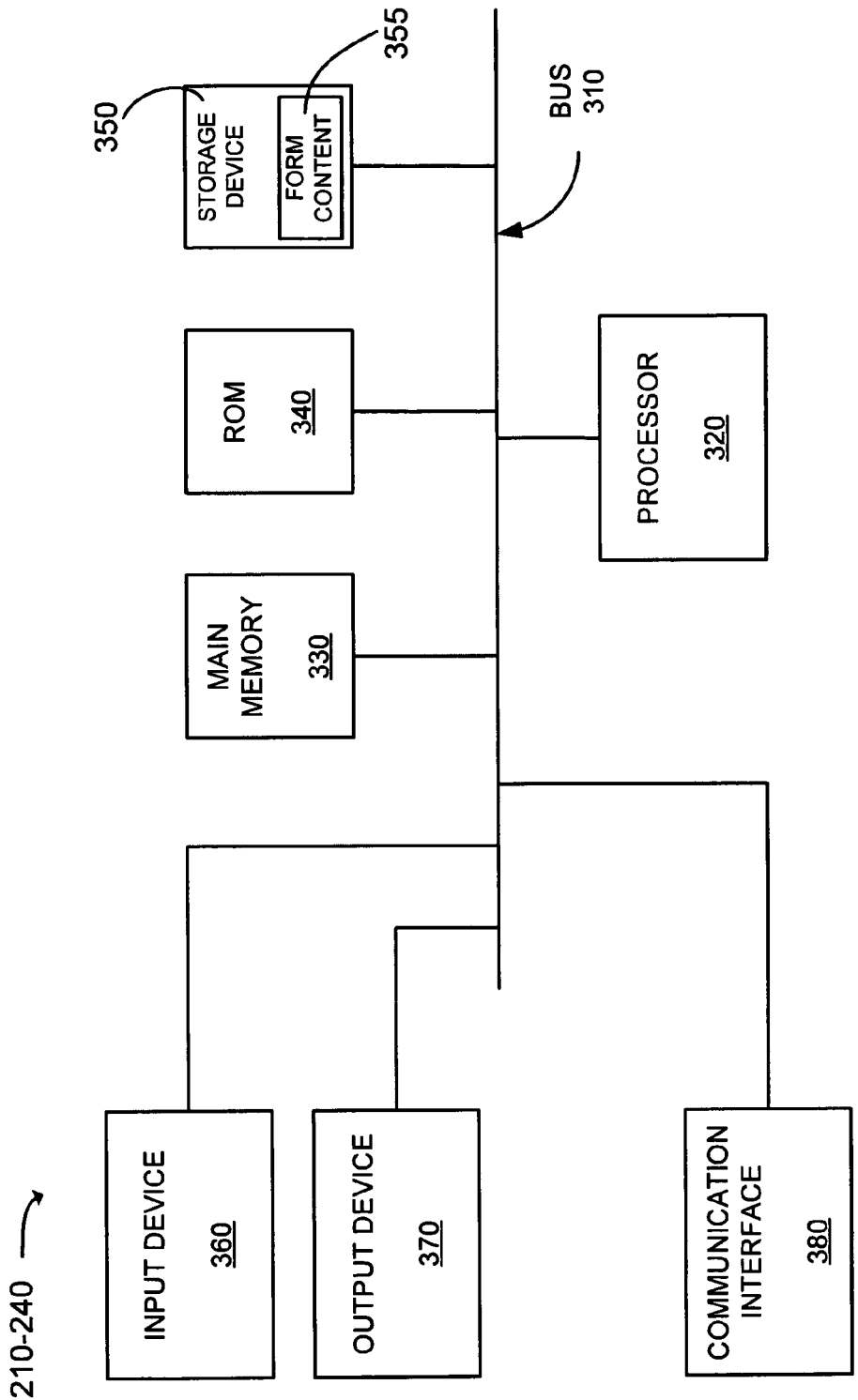
FIG. 3 is an exemplary diagram of a client or server of FIG. 2.

FIG. 3 is an exemplary diagram of a client or server entity (hereinafter called "client/server entity"), which may correspond to one or more of clients 210 and/or servers 220-240. The client/server entity may include a bus 310, a processor 320, a main memory 330, a read only memory (ROM) 340, a storage device 350, an input device 360, an output device 370, and a communication interface 380. Bus 310 may include a path that permits communication among the elements of the client/server entity.

Processor 320 may include a processor, microprocessor, or processing logic that may interpret and execute instructions. Main memory 330 may include a random access memory (RAM) or another type of dynamic storage device that may store information and instructions for execution by processor 320. ROM 340 may include a ROM device or another type of static storage device that may store static information and instructions for use by processor 320. Storage device 350 may include a magnetic and/or optical recording medium and its corresponding drive.

Input device 360 may include a mechanism that permits an operator to input information to the client/server entity, such as a keyboard, a mouse, a pen, voice recognition and/or biometric mechanisms, etc. Output device 370 may include a mechanism that outputs information to the operator, including a display, a printer, a speaker, etc. Communication interface 380 may include any transceiver-like mechanism that enables the client/server entity to communicate with other devices and/or systems. For example, communication interface 380 may include mechanisms for communicating with another device or system via a network, such as network 250.

As will be described in detail below, the client/server entity, consistent with the principles of the invention, may perform certain document processing-related operations. The client/server entity may perform these operations in response to processor 320 executing software instructions contained in a computer-readable medium, such as memory 330. A computer-readable medium may be defined as a physical or logical memory device and/or carrier wave.

The software instructions may be read into memory 330 from another computer-readable medium, such as data storage device 350, or from another device via communication interface 380. The software instructions contained in memory 330 may cause processor 320 to perform processes that will be described later. Alternatively, hardwired circuitry may be used in place of or in combination with software instructions to implement processes consistent with the principles of the invention. Thus, implementations consistent with the principles of the invention are not limited to any specific combination of hardware circuitry and software.

Exemplary Computer-Readable Medium

Figure 4:
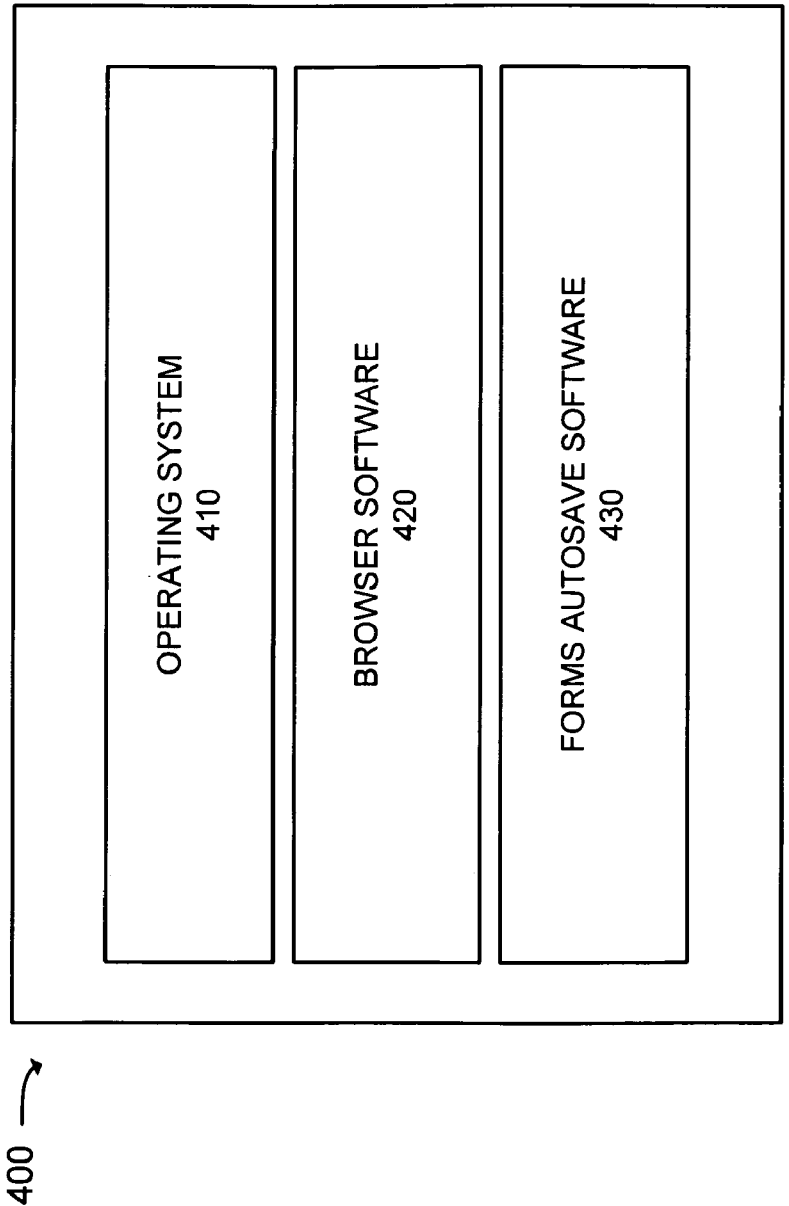
FIG. 4 is a diagram of a portion of an exemplary computer-readable medium that may be used by a client of FIG. 2.

FIG. 4 is a diagram of a portion of an exemplary computer-readable medium 400 that may be used by a client 210. In one implementation, computer-readable medium 400 may correspond to memory 330 of a client 210. The portion of computer-readable medium 400 illustrated in FIG. 4 may include an operating system 410, browser software 420, and forms autosave software 430.

More specifically, operating system 410 may include operating system software, such as the Microsoft Windows®, Unix, or Linux operating systems. Browser software 420 may include software associated with a web browser, such as the Microsoft® Internet Explorer, Netscape Navigator, or Mozilla Firefox browser.

Forms autosave software 430 may include a plug-in, an applet, a dynamic link library (DLL), a bookmark, or a similar executable object or process. Client 210 may obtain the executable object or process from server 220 or from a third party, such as a third party server, disk, tape, network, CD-ROM, etc. Alternatively, the executable object or process may be pre-installed on client 210.

Additionally, forms autosave software 430 may cause a user interface object, such as a toolbar button, a menu item, a link, a frame, etc., to be presented within a web browser window. The user interface object may operate in conjunction with the web browser. In another implementation, the user interface object may be an integrated part of the web browser. In this latter implementation, the web browser may perform the functions of the user interface object. In yet another implementation, the user interface object is a process separate from the web browser. For example, the user interface object may interface between the web browser and network 250.

Forms autosave software 430 may be automatically activated upon initiation of the web browser. Alternatively, forms autosave software 430 may be activated when instructed by a user. In either case, the forms autosave feature may take the form of a user interface object, examples of which are described below.

Figure 5:
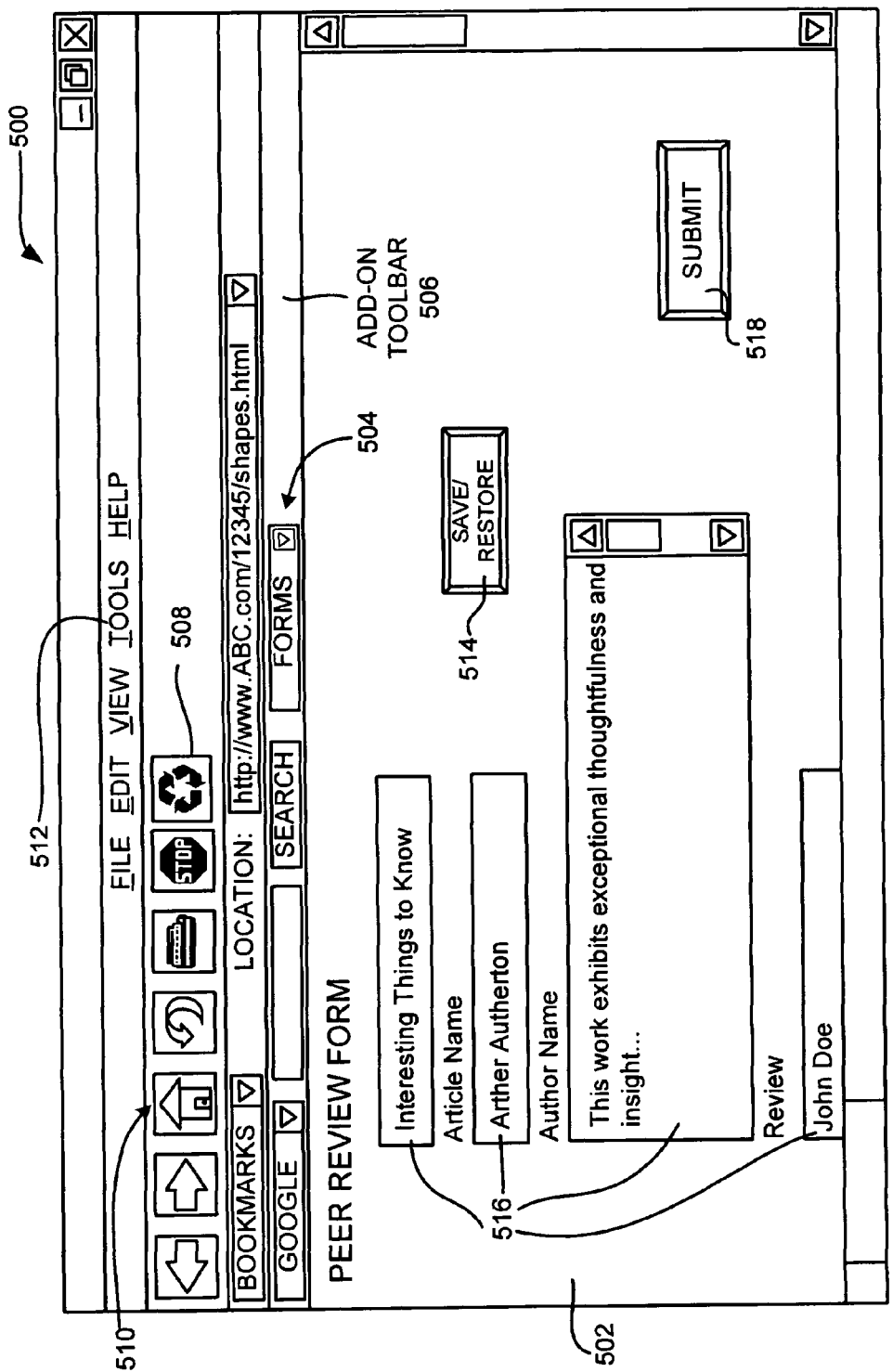
FIG. 5 is an exemplary diagram of a graphical user interface that illustrates various implementations of forms autosave feature.

FIG. 5 is an exemplary diagram of a graphical user interface 500 that illustrates various implementations of the forms autosave feature. Graphical user interface 500 may, for example, correspond to a web browser window that currently displays a document 502.

According to one implementation, the forms autosave feature may be implemented as a toolbar option 504 of an add-on toolbar 506. Add-on toolbar 506 may include one or more search boxes, software buttons, and/or menu elements selectable by a user to initiate different functions by add-on toolbar 506. In this case, a user may activate one or more functions of the forms autosave feature by selecting (e.g., clicking on) toolbar button 504 on the add-on toolbar 506. According to another implementation, the forms autosave feature may be implemented as a toolbar button 508 incorporated within a typical web browser toolbar 510. In this case, a user may activate a function of the forms autosave feature by selecting toolbar button 508 on browser toolbar 510. According to yet another implementation, the forms autosave feature may be implemented as a menu item (not shown) within a menu 512 (e.g., a "Tools" menu) of a web browser window. In this case, a user may activate a function of the forms autosave feature by selecting the menu item within the menu 512. According to a further implementation, the forms autosave feature may be implemented as a link or button 514 embedded within the document currently being displayed within a web browser window. It should be appreciated to those skilled in the other art that in yet other implementations, other mechanisms— which may or may not be integrated within a web browser— for providing functionality of the forms autosave feature described herein may be used without departing from the spirit of the present invention.

As will be discussed in additional detail below, the forms autosave feature may be of particular utility on forms-based web documents, such as web document 502. As illustrated in FIG. 5, web document 502 may be a forms-based web document, such as a peer-review submission document, a web-based email composition document, a web log (i.e., "blog") document, a message board submission document, a checkout document associated with a web retailer, etc. In practice, any web document capable of receiving textual information from a user may be subject to improvements consistent with principles of the invention. Turning specifically to FIG. 5, web document 502 may include a number of free-form text entry fields 516. Additionally, web document 502 may include a submit option 518 in the form of a link or button. Upon receipt of a user selection of the submit option 518, the user-entered contents of web document 502 may be transmitted to a recipient, thereby ending a current text entry session.

Figure 6:
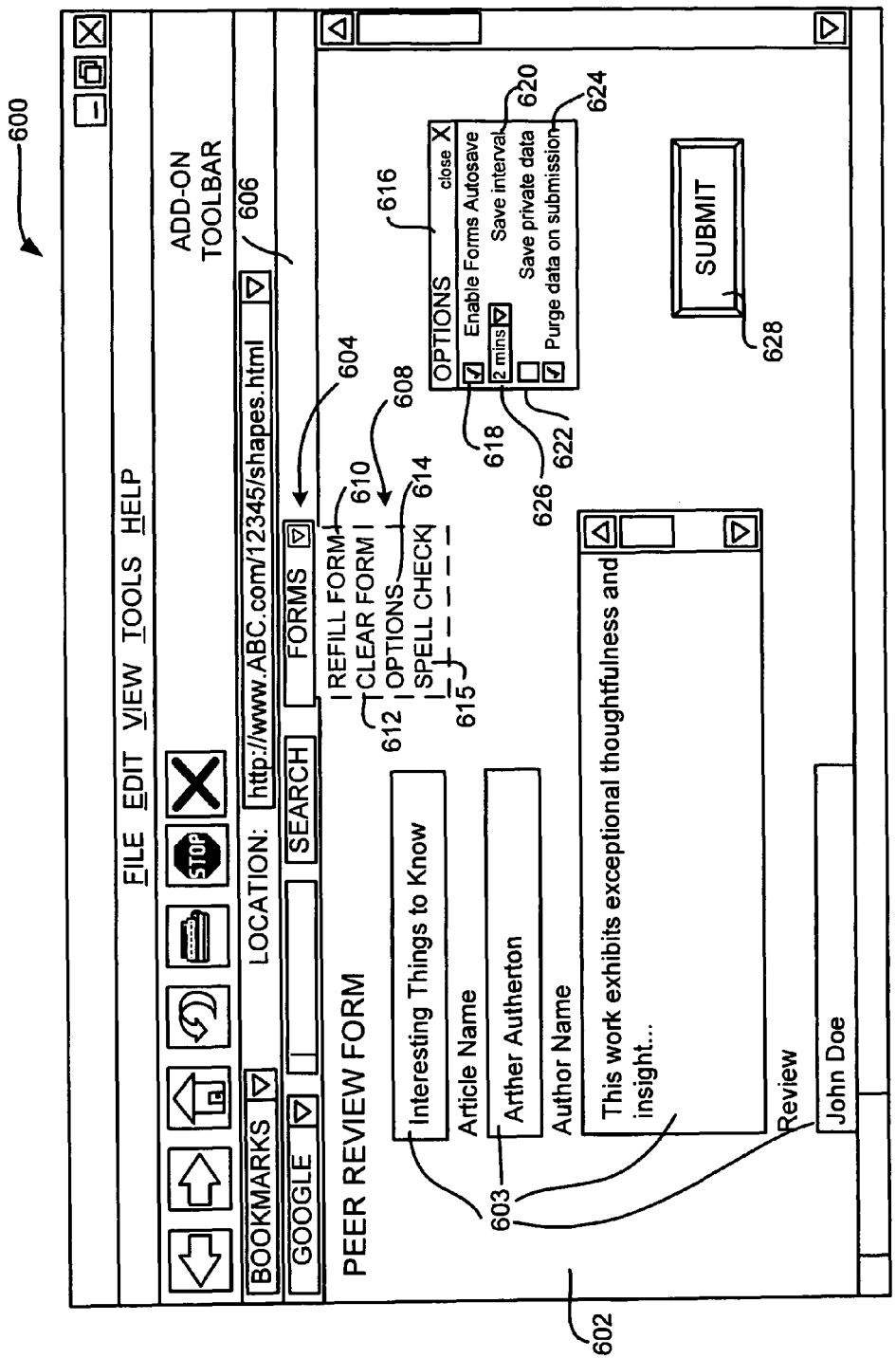
FIG. 6 is an exemplary diagram of a graphical user interface that illustrates additional implementations of the forms autosave feature.

FIG. 6 is another exemplary diagram of a graphical user interface 600 more fully illustrating one embodiment of the forms autosave feature described above, with respect to FIG. 5. As with the embodiment of FIG. 5, graphical user interface 600 may again correspond to a web browser window that displays a web document 602 including a number of free-form text entry fields 603. In accordance with the present embodiment, graphical user interface 600 may implement the forms autosave feature as a toolbar option 604 of an add-on toolbar 606. Further, upon initial selection of toolbar option 604 (e.g., by clicking on, hovering over, etc.), additional options 608 may be presented to the user.

For example, a first option 610 may provide users with the ability to refill or repopulate content on a current form displayed in web document 602 based on periodically saved content previously input by the user. A second option 612 may provide users with the ability to clear currently populated or saved content. A third option 614 may provide users with a selection of configuration options relating to the manner in which forms content is saved, maintained, and/or used. A fourth option 615 may provide users with the ability to spell check current forms content.

Consistent with one implementation of the invention, user selection of third option 614 may result in the display of a configuration options dialog box 616 configured to receive user selections of various forms autosave related configuration options. For example, configuration options dialog box 616 may provide an enable forms autosave option 618, a save interval option 620, a save private data option 622 and a purge data on submission option 624.

More specifically, enable forms autosave option 618 provides users with the ability to enable or disable the saving of forms content within web document 602. Save interval option 620 may include a user selectable menu or alternate entry means 626 for enabling users to indicate a save interval for periodically saving text information or content entered in forms on web document 602. In one implementation consistent with principles of the invention, the saved forms content may be maintained in a form content memory associated with the forms autosave software 430, such as memory 330 or storage device 350. Save private data option 622 may receive a user's selection of whether the forms autosave feature should periodically save information contained within forms relating to potential private data, such as forms relating to bank account numbers, social security numbers, credit card numbers, etc. In this manner, users may feel more confident that potentially private data is not stored on the user's computer. Purge data on submission option 626 may receive a user's selection of whether the forms autosave feature should purge or delete any saved information associated with web document 602 upon successful submission of the forms content. De-selection of this option may maintain any input forms content within the form content memory for an indefinite period of time.

In implementations consistent with principles of the invention, selection of toolbar option 604 may result in the display or creation of a separate configuration options dialog box 616. Alternatively, configuration options dialog box 616 may be rendered or generated within the current web document 602 using technology such as Flash or Java. Regardless of the manner of display or interaction, user selections within configuration options dialog box 616 may remain persistent within web browser, thereby ensuring that the options selected are effective for subsequent web documents.

Web document 602 may additionally include a submit option 628 in the form of a link or button. Upon receipt of a user selection of the submit option 628, the user-entered contents of the text entry fields 603 of web document 602 may be transmitted to a recipient, thereby ending a current text entry session.

Exemplary Processing

Figure 7:
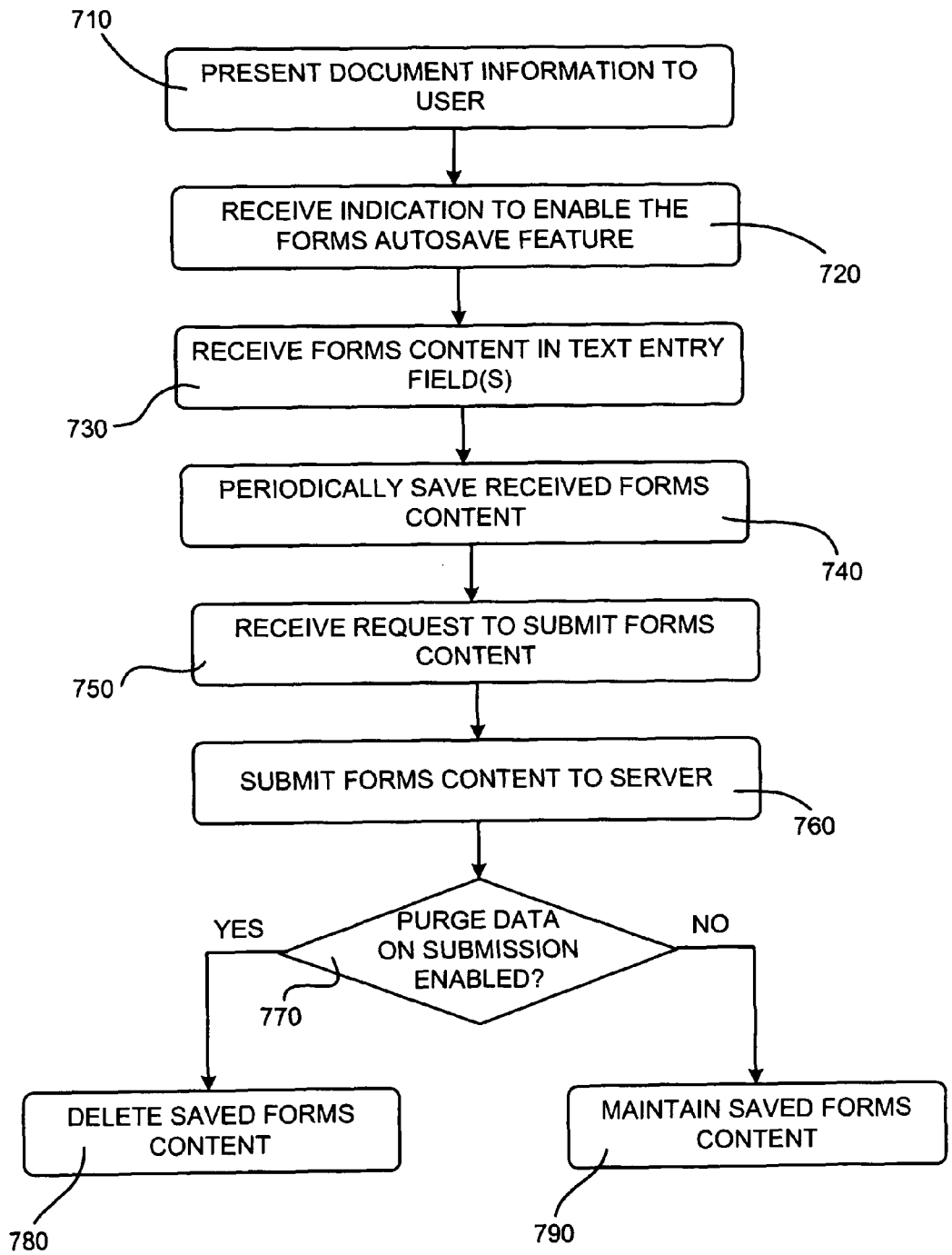
FIG. 7 is a flowchart of an exemplary process for implementing a forms autosave feature.

FIG. 7 is a flowchart of an exemplary process for implementing a forms autosave feature. In one embodiment, the processing of FIG. 7 may be performed by one or more software and/or hardware components within client 210, server 220, or a combination of client 210 and server 220. In another implementation, the processing may be performed by one or more software and/or hardware components within another device or a group of devices separate from or including client 210 and/or server 220.

Processing may begin with document information being presented to a user (block 710). For example, the user might provide an address to a web browser on client 210, which may result in a web document (such as web document 602) being displayed within the web browser window. As described in detail above, the web document may include one or more forms each including one or more text entry fields for receiving user-entered text content. Additionally, forms autosave software 430 associated with the client 210 provides forms autosave functionality for the web browser.

Following display of the web document, an indication to enable the forms autosave feature may be received from the user (block 720). As described above, such an indication may include user selection of enable forms autosave option 618 in configuration options dialog box 616. In one implementation consistent with principles of the invention, options 620-624 in configuration options dialog box 616 may be selected contemporaneously with option 618 or may include default values not specifically selected by the user. In one embodiment, a default save interval associated with option 620 may be 2 minutes, save private data option 622 may be de-selected by default, and purge data on submission option 624 may be selected by default. Additionally, it should be understood that the options configured in configuration options dialog box may be established in one instance and remain persistent across many different web documents, thereby providing consistent forms autosave functionality to different documents.

Next, forms content may be received from the user, thereby populating or partially populating one or more of the text entry fields in the displayed web document (block 730). In accordance with either the default save interval or an alternate user selected save interval, the forms content received from the user may be periodically saved into the form content memory for subsequent retrieval (block 740). In accordance with principles of the invention, the saved content may be associated with web document 602 and specific text entry fields 603 within web document 602. In accordance with the save private data option 622, processing may further include determining whether a text entry field is associated with private data and, if so, not saving any forms content received therein. As is understood in the art, the text entry fields 603 in web document 602 may include non-visible metadata which servers to identify the content of the associated text entry field. The private data determination may use this metadata information to determine privacy sensitive information which may be subject to save private data option 622.

Upon successful population of all desired text entry fields, a request to submit the forms content (e.g., a click on submit button 628) may be received from the user (block 750). In response, client 210 may submit the forms content to server 220 (block 760). It may then be determined whether purge data on submission option 624 has been selected or de-selected (block 760). If purge data on submission option 624 has been selected, the previously saved forms content associated with web document 602 may be deleted or otherwise removed from the form content memory (block 780). However, if purge data on submission option 624 has been de-selected, the previously saved forms content associated with web document 602 is maintained in form content memory (block 790).

Figure 8:
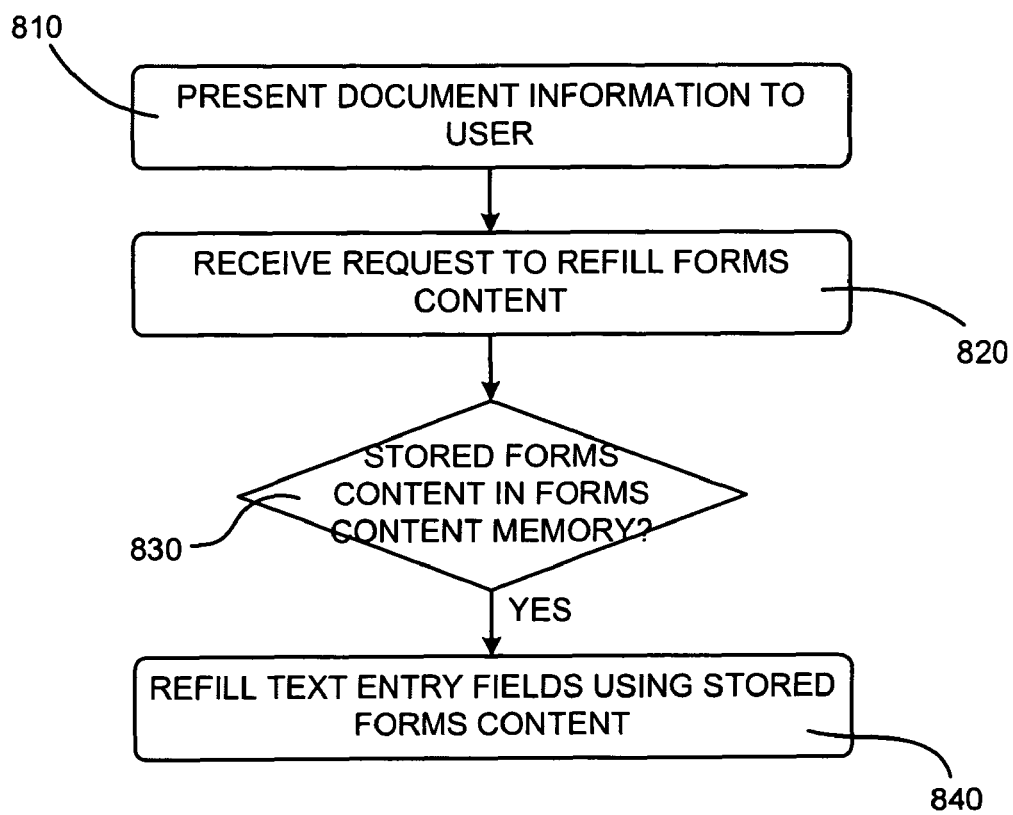
FIG. 8 is a flowchart of an exemplary process for retrieving forms content in accordance with principles of the invention.

FIG. 8 is a flowchart of an exemplary process for retrieving forms content in accordance with principles of the invention. Processing may begin with document information being presented to a user (block 810). As with the embodiment of FIG. 7, the document information may take the form of a web document (such as web document 602) being displayed within the web browser window. The web document may include one or more forms each including one or more text entry fields (such as text entry fields 603) for receiving user-entered text content.

Upon retrieval or display of web document 602, it may be determined whether a user request to refill the text entry fields 603 with associated form content stored in form content memory (e.g., selection of refill form option 610) (block 820). In one implementation consistent with principles of the invention, saved form content may be associated with both a web document URL (uniform resource locator) or other identification element, as well as individual text entry identifiers, such as html metadata, etc. If such a request is received, it is then determined whether form content memory includes form content for one or more of the text entry fields 603 in web document 602 (block 830). If it is determined that form content memory includes form content for one or more of the text entry fields 603 in web document 602, the form content is received and populated within the associated text entry fields (block 840).

In an alternative implementation consistent with principles of the invention, the process of blocks 820-830 may be performed automatically, upon display of web document 602, thereby eliminating the affirmative user action of requesting a forms refill.

CONCLUSION

Systems and methods consistent with the principles of the invention may provide a forms autosave feature by which previously input forms content may be periodically saved for subsequent retrieval in the event of an erroneous user action (e.g., back click), browser crash, system crash, etc. Alternative, the forms autosave feature may enable users to return to a partially completed web form prior to submission. Upon a subsequent visit to the forms document, the user may refill or repopulate the forms document using the previously saved content information, thereby saving invaluable time and increasing productivity.

The foregoing description of preferred embodiments of the present invention provides illustration and description, but is not intended to be exhaustive or to limit the invention to the precise form disclosed. Modifications and variations are possible in light of the above teachings or may be acquired from practice of the invention.

For example, while series of acts have been described with regard to FIGS. 7 and 8, the order of the acts may be modified in other implementations consistent with the principles of the invention. Further, non-dependent acts may be performed in parallel.

Also, exemplary user interfaces have been described with respect to FIGS. 5 and 6. In other implementations consistent with the principles of the invention, the user interfaces may include more, fewer, or different pieces of information.

The preceding description refers to a user. A "user" is intended to refer to a client, such as a client 210 (FIG. 2), or an operator of a client 210.

It will be apparent to one of ordinary skill in the art that aspects of the invention, as described above, may be implemented in many different forms of software, firmware, and hardware in the implementations illustrated in the figures. The actual software code or specialized control hardware used to implement aspects consistent with the principles of the invention is not limiting of the invention. Thus, the operation and behavior of the aspects were described without reference to the specific software code—it being understood that one of ordinary skill in the art would be able to design software and control hardware to implement the aspects based on the description herein.

No element, act, or instruction used in the present application should be construed as critical or essential to the invention unless explicitly described as such. Also, as used herein, the article "a" is intended to include one or more items. Where only one item is intended, the term "one" or similar language is used. Further, the phrase "based on" is intended to mean "based, at least in part, on" unless explicitly stated otherwise.

What is claimed is:

1. A method performed by a device, the method comprising:
 presenting, via an output device of the device, a first web document including a first form having a first text entry field;
 presenting, via the output device and in association with the first web document, a list of options relating to entering text into the first text entry field, the list of options including an autosave option and a purge option;
 determining that the autosave option is enabled and the purge option is enabled;
 receiving, via an input device of the device and from a user, first forms content into the first text entry field;
 determining whether a portion of the received first forms content comprises private data that includes confidential information of the user;
 in response to determining that the autosave option is enabled and determining that the portion of the received first forms content comprises the private data, periodically and automatically storing, by a processor of the device and to a memory of the device, at least a portion of the received first forms content and not storing the portion of the received first forms content that comprises the private data;
 receiving, by a processor of the device and subsequent to the storing the at least a portion of the received first forms content, a first request to submit the first forms content;
 submitting, by a processor of the device and in response to receiving the first request, the received first forms content to a server;
 deleting, by a processor of the device, upon submitting the received first forms content to the server, and in response to determining that the purge option is enabled, the at least a portion of the received first forms content from the memory;
 presenting, via the output device, a second web document including a second form having a second text entry field;
 presenting, via the output device and in association with the second web document, a list of options relating to entering text into the second text entry field, the list of options including the autosave option and the purge option;
 determining that the autosave option is enabled and the purge option is disabled;
 receiving, via the input device, second forms content into the second text entry field,
 in response to determining that the autosave option is enabled, periodically and automatically storing, by a processor of the device and to the memory of the device, at least a portion of the received second forms content;
 receiving, by a processor of the device and subsequent to the storing the received second forms content, a second request to submit the second forms content;
 submitting, by a processor of the device and in response to receiving the second request, the received second forms content to a server; and
 retaining, by a processor of the device, upon submitting the received second forms content to the server, and in response to determining that the autosave option is enabled and the purge option is disabled, the at least a portion of the received second forms content in the memory.

2. The method of claim 1, further comprising:
 receiving a request to enable the autosave option; and
 enabling the autosave option based on the received request.

3. The method of claim 1, further comprising:
 receiving selection of the autosave option; and
 performing the periodically and automatically storing of the received first forms content upon receiving selection of the autosave option.

4. The method of claim 3, where presenting the autosave option includes:
 providing a selectable object for enabling the autosave option, the selectable object including at least one of a link, a menu item, or a button;
 receiving selection of the at least one of the link, the menu item, or the button; and
 enabling the autosave option based on the received selection of the at least one of the link, the menu item, or the button.

5. The method of claim 1, where receiving the first forms content includes:
 determining that forms content has been previously stored for the presented first web document;
 retrieving the first forms content, from the previously stored forms content, upon determining that forms content has been previously stored for the presented first web document; and
 populating the first text entry field with the retrieved first forms content.

6. The method of claim 5, further comprising:
 providing a populate option to enable a populate request;
 receiving selection of the populate option; and
 performing the retrieving and populating upon receiving selection of the populate option.

7. The method of claim 1, further comprising:
 providing a clear forms option for clearing of forms content from the first web document;
 receiving selection of the clear forms option; and
 removing the received first forms content from the first web document in response to receiving selection of the clear forms option.

8. The method of claim 7, further comprising:
 removing the periodically stored first forms content associated with the first web document.

9. A system implemented within a computer device, comprising:
 a memory to store instructions; and
 a processor to execute the instructions to:
  present a web document including a form having a text entry field;
  provide an autosave option for enabling periodic storing of forms content received within the text entry field, where the periodic storing of forms content is initiated by the processor;
  receive a save interval relating to the periodic storing of forms content;
  set the periodic storing of forms content based on the received save interval;
  provide a purge option;
  receive selection of the autosave option to enable the autosave option;
  receive forms content in the text entry field;
  periodically store, in the memory, in response to the autosave option being enabled and based on the set periodic storing of forms content, the received forms content prior to receiving a request to submit the received forms content;
  submit the received forms content to a server;
  determine, upon submitting the received forms content, whether the purge option is enabled;

delete, upon submitting the received forms content and upon determining that the purge option is enabled, the periodically stored forms content from the memory; and retain, upon submitting the received forms content and upon determining that the purge option is disabled, the periodically stored forms content in the memory.

10. The system of claim 9, where the processor further executes the instructions to:

determine that forms content has been previously stored for the presented web document; and automatically refill the text entry field using the previously stored forms content upon determining that forms content has been previously stored for the presented web document.

11. A method performed by a client device, the method comprising:

providing a selectable object within a web browser application window of an output device of the client device, where the selectable object enables or disables a retaining, in a memory of the client device, of information entered into a form upon submission of the form;

providing, within the web browser application window of the output device, a document that includes a particular form;

receiving, by a processor of the client device, a selection of the selectable object to disable the retaining of information entered into the particular form;

determining, by the processor, that forms content, received from a user and relating to the document has been previously stored in the memory, where the previously stored forms content excludes content, received from the user, that includes confidential information of the user, and where the content is excluded based on a determination, by the processor, that the content includes the confidential information of the user;

refilling, by the processor, the form with the previously stored forms content;

displaying, by the output device, the refilled form within the web browser application window;

receiving, by the processor, a request to submit the previously stored forms content;

transmitting, by the processor, the previously stored forms content to a server;

determining, by the processor, upon transmitting the previously stored forms content to the server, that the selectable object has been selected to disable the retaining of information entered into the form; and deleting, by the processor, the previously stored forms content from the memory upon determining that the selectable object has been selected to disable the retaining of information entered into the form and in response to the previously stored forms content being transmitted to the server.

12. The system of claim 9, where, when presenting a web document, the processor is to present a web browser application window, and when providing the autosave option, the processor is to provide one of a selectable object in an add-on toolbar associated with the web browser application window, a selectable object in a browser toolbar associated with the web browser application window, a menu item within a web browser application window, or a selectable object embedded within the web document.

13. A computer-readable memory device incorporating one or more instructions, executable by a client device, to perform a method comprising:

receiving a request from a user to present, in a web browser application, a web document that includes a form;

presenting, in the web browser application, the web document that includes the form;

receiving, from the user and in the web browser application, forms content in the form;

determining whether a portion of the received forms content includes confidential information of the user;

initiating a periodic and automatic saving of the received forms content prior to receiving a request to submit the received forms content, where the periodic and automatic saving is initiated by the client device at a predefined interval, and where the saved forms content excludes the portion of the received forms content that includes the confidential information of the user;

receiving, subsequent to the periodic and automatic storing of the received forms content, a request to submit the received forms content; and submitting, in response to receiving the request to submit the received forms content, the received forms content to a server.

14. The computer-readable memory device of claim 13, further comprising:

determining that prior forms content has been previously saved for the web document; and populating the form using the saved prior forms content upon determining that prior forms content has been previously saved for the web document.

15. The computer-readable memory device of claim 14, where populating the form using the saved prior forms content further comprise automatically populating the form using the saved prior forms content.

16. The computer-readable memory device of claim 13, further comprising:

presenting a purge option;

receiving a selection of the purge option, where selection of the purge option enables the purge option;

determining, upon submitting the form to the server, that the purge option is enabled; and deleting the saved forms content associated with the form upon submitting the form to the server and upon determining that the purge option is enabled.

17. The method of claim 11, where the selectable object is provided as one of a selectable object in an add-on toolbar associated with the web browser application window, a selectable object in a browser toolbar associated with the web browser application window, a menu item within a web browser application window, or a selectable object embedded within the web document.

18. The method of claim 11, further comprising:

providing an option for clearing of the forms content from the document;

receiving selection of the option; and removing the forms content from the document upon receiving selection of the option.

* * * * *